Nov. 30, 1965　　F. J. FUELL　　3,220,317
SERVO SYSTEMS
Filed May 11, 1961　　2 Sheets-Sheet 1
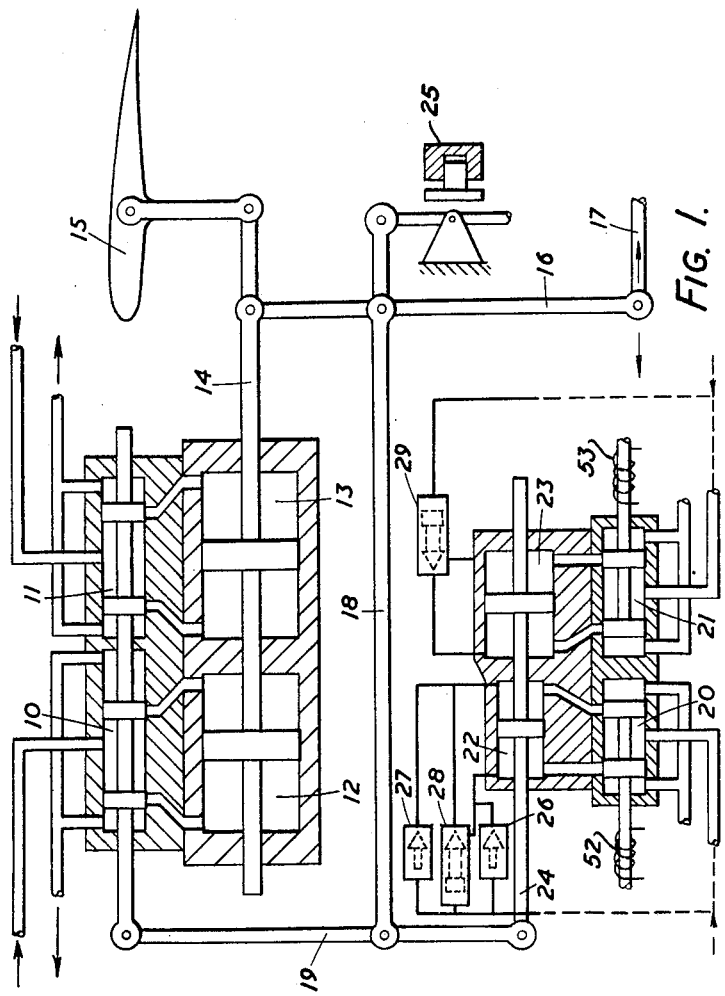
INVENTOR
FREDERICK J. FUELL
ATTORNEYS

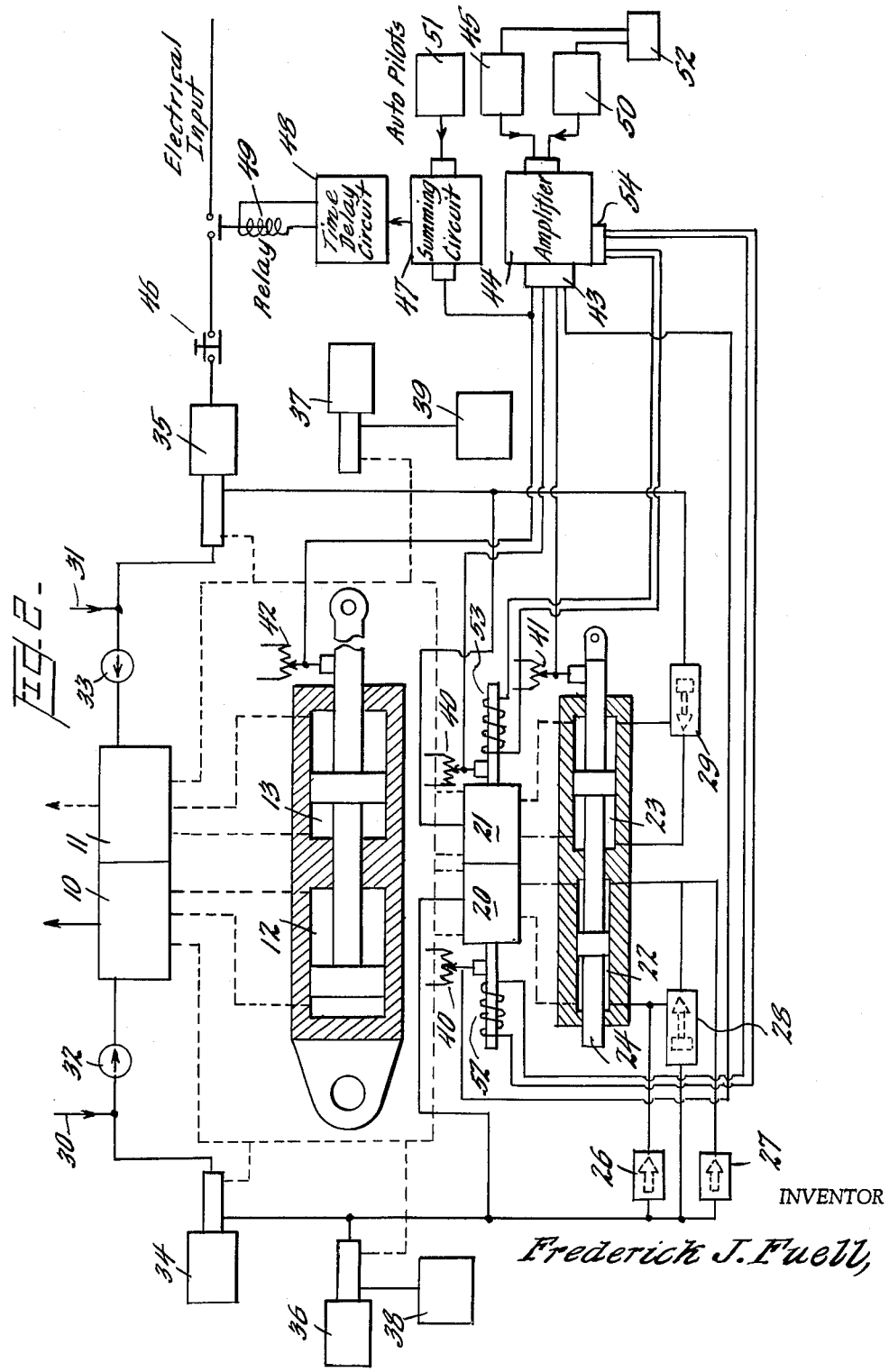

United States Patent Office 3,220,317
Patented Nov. 30, 1965

3,220,317
SERVO SYSTEMS
Frederick James Fuell, Heston, England, assignor to Fairey Engineering Limited, Heston, England, a company of Great Britain
Filed May 11, 1961, Ser. No. 109,345
Claims priority, application Great Britain, May 12, 1960, 16,863/60
6 Claims. (Cl. 91—411)

This invention relates to duplicated servo systems, and an object of the invention is to provide a form of system in which the effects of failure of either channel will be minimised.

According to the present invention a duplicated servo system includes two servo motors acting simultaneously on a common driven member, the motor of one channel (referred to as the major channel) being more powerful than the motor of the other channel (referred to as the minor channel) so as to override it in the event of a fault in the minor channel, and means for putting the motor of the major channel out of action in the event of a fault in that channel.

The invention may be applied to a system in which the two motors are connected in parallel so that their movements are in fixed proportion and their forces are added, in which case the major motor should be capable of exerting a greater force on the driven member than the minor motor. In a preferred arrangement the major motor is capable of exerting approximately double the force that the minor motor is capable of exerting.

The invention may also be applied to a system in which the two motors are connected in series or differentially, so that the forces are in fixed proportion and the movements of the driven member which they produce are added, in which case the major motor should be capable of producing greater movement than the minor motor.

Manual means may be provided for putting the major motor out of action. Preferably, however, alternatively or in addition, automatic means are provided for putting the major motor out of action. The automatic means may be arranged to respond when the difference between the movement required and the movement produced, for example the input and output of the complete system, exceeds a predetermined value. A time delay may be incorporated in the automatic means to ensure that the major motor is put out of action only when the fault in the major system persists for a predetermined time.

The invention may be carried into practice in various ways, but one specific embodiment will be described by way of example with reference to the accompanying drawings, in which:

FIGURE 1 is a schematic diagram of the hydraulic system of the invention, and

FIGURE 2 is a block diagram of the hydaulic and electrical circuits of a duplicated hydraulic servo system for the automatic control of a high-speed low-flying aircraft.

The control system comprises two stages, each duplicated. The second stage provides power operation under either manual or automatic control, and comprises main valves 10 and 11 controlling the flow of hydraulic fluid to and from main jacks 12 and 13 arranged in tandem with their pistons acting on a common piston rod 14 connected to a control surface 15.

A follow-up lever 16 has one end pivoted to the piston rod 14 and its other end pivoted to a link 17 constituting a manual operating member connected for example to a control column, whilst an intermediate point is connected through a link 18 and a lever 1 to the two main valves 10 and 11. Thus if the control column is moved the valves will be actuated to admit fluid to the main jacks, and this will shift the control surface and at the same time move the link 18 back to its original position to close the main valves. For example, if the pilot's link 17 is moved to the left, the lever 16 will pivot about its top end, i.e., its connection to the main piston rod 14, and hence move the link 18 to the left. The lever 19 will pivot about its lower end, connected to the first stage piston rod 24, moving the second stage valves 10, 11 to the left, and admitting pressure fluid to the left-hand ends of the second stage cylinders 12 and 13, so as to move their pistons to the right. This rocks the upper end of the link 16 to the right, so as to return the link 18 to the right, until it returns to its original position closing the valves 10 and 11. The effect is that the lever 16 virtually rocks about its connection to the valves 10 and 11, i.e., to the link 18, turning the control surface 15 counterclockwise as it moves to the left and vice versa.

The first stage of the system, which is also duplicated but functions only for automatic control, comprises a pair of valves 20 and 21 each operated electrically by solenoids 52 and 53 from outputs 54 of an amplifier 44 under the control of automatic pilots 50 and 45 and controlling the flow of hydrauic pressure fluid to and from a pair of first stage jacks 22 and 23. The duplicated automatic pilots 45 and 50 receive their input signals from a common control, for example the solenoid 52. The first stage jacks are connected in tandem to a common piston rod 24 which is also connected to the floating lever 19. Thus the first stage jacks are connected to one end of the lever 19, the main valves 10 are connected to its opposite end and the manual control link 18 is connected to an intermediate point of it. The link 18 is also connected to a centering and locking device indicated diagrammatically at 25 which can be actuated to bring the link 18 to a central position and hold it therein when automatic control is to be employed. The pilot can override the lock to gain manual control at will. It will be appreciated that when the link 18 is locked the follow-up lever 16 will pivot about its connection to the link 18 and hence the manual operating link 17 will follow the movement of the main piston rod 14 and hence of the control surface so as to give an indication to the pilot.

Each portion of the system which is duplicated may be regarded as comprising two channels. In the specific embodiment shown, the same input is applied to the two autopilots 45 and 50 while the two first-stage jacks are mechanically coupled to give the same output. Hence in this case the components of each channel of the first stage may be regarded as comprising the first-stage jack, the first-stage valve, the associated portion of the amplifier 44 and the associated automatic pilot. It will, however, be appreciated that in different arrangements different portions of the complete system may be duplicated so that different components will be included in the two channels.

In addition, each complete channel embodies three feed-back loops 40, 41 and 42, the sources of which are common to both channels. These are represented as potentiometer circuits in FIGURE 2. A signal corresponding to the output from the first stage valves 20, 21, and hence corresponding to the second differential coefficient of the angular position, is fed back as a first feed-back 40 to the amplifier input 43. A signal corresponding to the output from the first-stage jacks 22, 23, corresponding to the rate of change of angle, is also fed back to the amplifier input 43 as a second feed-back 41; whilst a signal corresponding to the output from the main jacks 12, 13, that is to say the change of angle of the control surface 15, is also fed back to the amplifier input 43 as a third feed-back 42.

In the particular embodiment in question the system has full authority, that is to say it can move the associated control surface through the full range of movement available to the pilot. In these circumstances any failure of the system, especially bearing in mind that the aircraft is intended to fly at high speed and low altitude may be very serious. Moreover the daanger is not overcome by the mere duplication of the system. If a fault occurs in one channel and the jack of that channel attempts to produce improper operation of the control column the jack of the sound system will oppose the improper movement. If the two jacks were equally powerful the jack of the sound system might be able to prevent improper movement but would be unable to produce any movement in the opposite direction. Hence whenever a signal was received by the sound system calling for movement in the same direction as the movement which the faulty jack is attempting to produce, the movement would occur, but whenever a signal calling for contrary movement was required the movement would not occur. Hence the result would be a ratchet type of movement whereby the combined system would drift in the runaway sense. The system could then only be returned to neutral by finding out which channel was faulty and putting it out of action, or by putting both first stage channels out of action and reverting to manual control. The latter is clearly undesirable since the automatic control system forms a vital link in the control chain which permits the aircraft to fulfill its mission under all operational conditions.

It is not a simple matter to determine which channel is faulty, since the main electrical feed-back, even though duplicated, will give the same signal to both channels since it is controlled by the output of the single ram of the said jack.

To overcome this difficulty the present arrangement incorporates first-stage jacks of different sizes. Thus the first stage jack piston 23 of one channel, which will be termed the major channel and is under the control of the autopilot 45, is slightly more than double the area of that of the other 22, or minor, channel which is under the control of the autopilot 50. At the same time the valves 20, 21 are designed so that a given signal will result in the same rate of movement in both jacks, even though one is much larger than the other. This may for example be achieved by choice of the dimensions of the valves or their operating mechanism. The jack of the minor channel is provided with pressure-loaded relief valves 26 and 27 which blow back to the pressure line when the pressure in the jack chamber exceeds a line pressure (of say 3000 pounds per square inch) by a predetermined quantity (say 200 pounds per square inch). In addition each of the first stage jacks is provided with a pressure-loaded by-pass valve 28 or 29, responsive to the supply pressure for that channel, and arranged to interconnect the two sides of the piston when there is no pressure supply to the particular channel, either because the supply has failed or because only the other channel has been selected.

It will therefore be appreciated that in normal operation both channels function simultaneously. If, however, a fault should develop on the minor channel tending to produce improper operation of the minor first-stage jack 22, this will be opposed by the major first-stage jack 23 which is sufficiently powerful to override the minor first-stage jack and not only prevent improper movement but produce movement in the opposite direction when required. Thus improper operation cannot occur as a result of a fault in the minor channel. Accordingly if improper operation occurs it is clear that it must be due to a fault in the major channel. No further investigation or discrimination is required in order to determine that what is needed is to render the major channel inoperative, whereupon the minor channel will continue to exercise proper control.

As shown in FIGURE 2, the main valves 10 and 11 are connected to hydraulic supplies 30 and 31 through non-return valves 32 and 33. The auxiliary valves 20, 21 are connected to the same supplies 30 and 31 through solenoid controlled valves 34 and 35. These valves also control the supply, through further solenoid controlled valves 36 and 37, to clutches 38 and 39 which cause the pilot's control to follow the movement of the control surfaces, when the aircraft is under the control of the autopilot.

The pilot is provided with a switch 46 controlling the circuit of the solenoid controlled valve 35 controlling the supplies to the major channel so that the major channel can be put out of action manually by the pilot.

In addition, means is provided for automatically putting the major channel out of action. This comprises a summing circuit 47 to which are supplied a signal corresponding to the input (which may be derived from a third gyro pick-up 51) and a signal corresponding to the output (obtained from the third feed-back 42) of the system. The purpose of feedback 42 is to continuously provide position information from the main actuator for comparison with the input or demand signal 51. Whenever a signal is generated in autopilot elements 50, 45 and 51 an error must immediately exist automatically at feedback 42 and feedback 40 until such time as corrective action has taken place. The algebraic sum of the signal corresponding to the input from pickup 51 and the signal corresponding to the output from feedback 42 is fed through a time delay circuit 48 to a relay 49 which also controls the solenoid valve 35 controlling the supply of pressure liquid to the major channel as well as a cockpit warning lamp (not shown). Accordingly the summing circuit 47 compares the input from 51 with the output from 42, and if the error exceeds a predetermined value and persists for a predetermined time (which may be only of the order of milliseconds) the relay is operated to put the major channel out of action. If the error does not exceed a predetermined value or does not persist for a predetermined time the relay 49 will not be actuated and the major channel will continue to operate.

For example in one particular embodiment an error of approximately 1 part in 200 generates the full signal at the first stage valve. Allowing a fair margin to prevent inadvertent rejection of the major channel, an error of say 1 part in 100 could be used to put the major channel out of action. On a 30° travel this represents only 0.3° of surface deflection so that with this system a single runaway in any one flight is reduced in effect from a great potential hazard to a short-lived malfunction of no more than nuisance value.

On a system of the type in question many different faults can in theory occur, but with the system described employing a major and a minor channel, it is extremely unlikely that any will produce serious results. Thus, broadly speaking, if a fault occurs in the minor channel, whether it be failure of the hydraulic supply, sticking of a valve, or an electrical fault, it will have no effect at all, since the major channel can override the minor channel. On the other hand if a similar fault occurs in the major channel the output signal will depart from the input signal by a sufficient amount to reject the major channel, so that after a momentary malfunctioning of very short duration the major channel will be rejected and the minor channel will continue to function undisturbed. Certain faults, for example in the internal feed-back loops, may result in instability. Such a fault in the minor channel will not affect performance since the major channel will override it. If such a fault should occur in the major channel the results are unlikely to be sufficiently serious to operate the automatic means for putting the major channel out of action, but may be noticed by the pilot who can employ his emergency button 46 to put the major channel out of action.

In fact the system described offers most of the advantages of a triplicated system, with much reduced weight and complexity.

It will be appreciated that the invention is not restricted to the particular embodiment described. Thus for example in some known arrangements the two first-stage control jacks act on a floating lever so that the control signal injected into the main valve is the mean of the movements of the two first-stage jacks. In such a known system a runaway when full error is being held on the main valve again permits the sound system to cancel the error, but it still requires a deliberate action by the pilot to take off any surface displacement that may have been generated by the auto-control system immediately prior to the runaway. Under ground attack operational conditions, or in high-speed low-altitude flight under auto-control conditions, this is clearly unacceptable. The invention may be applied to such a system by modifying one of the jacks or its linkage to the control valve so that one jack, which becomes the major jack, produces a greater range of movement than the other jack.

What I claim as my invention and desire to secure by Letters Patent is:

1. A duplicated servo system including a major servo motor and a minor servo motor, two control devices each controlling the energization of one of said servo motors, the control devices being intended for simultaneous operation, a common driven member acted on simultaneously by both servo motors, the major servo motor being more powerful than the minor servo motor, so as to override it in the event of a fault in the latter, and automatic means responsive to the difference between the movement required and the movement produced for putting the major servo motor out of action.

2. A system as claimed in claim 1 in which the automatic means include a time delay device to ensure that the major motor is put out of action only when the fault in the major system persists for a predetermined time.

3. A duplicated servo system for actuation of an aircraft control including a major hydraulic servo jack and a minor hydraulic servo jack, said system having a first stage and a second stage whereof the major and minor servo jacks form part of the first stage, two control valves each controlling the energization of one of said servo jacks, the control valves being intended for simultaneous operation, a common driven member acted on simultaneously by both servo jacks, the major servo jack being more powerful than the minor servo jack, so as to override it in the event of a fault in the latter, and two automatic pilots in which each control valve of the first stage is under the control of one of the automatic pilots while the second stage is capable of being controlled manually.

4. A system as claimed in claim 3 in which the control by the automatic pilots has full authority.

5. A duplicated servo system for actuation of an aircraft control including a major hydraulic servo jack and a minor hydraulic servo jack, said system having a first stage and a second stage whereof the major and minor servo jacks form part of the first stage, two control valves each controlling the energization of one of said servo jacks, the control valves being intended for simultaneous operation, a common driven member acted on simultaneously by both servo jacks, the major servo jack being more powerful than the minor servo jack, so as to override it in the event of a fault in the latter, and two automatic pilots in which each control valve of the first stage is under the control of one of the automatic pilots while the second stage is capable of being controlled by the first stage.

6. A duplicated servo system including a major hydraulic servo jack and a minor hydraulic servo jack, two control valves each controlling the energization of one of said servo jacks, the control valves being intended for simultaneous operation, a common driven member acted on simultaneously by both servo jacks, the major servo jack being more powerful than the minor servo jack, so as to over-ride it in the event of a fault in the latter, and means responsive to the difference between the input and the output of the system for automatically putting the major servo jack out of action.

References Cited by the Examiner

UNITED STATES PATENTS

| | | | |
|---|---|---|---|
| 2,422,362 | 6/1947 | Moore. | |
| 2,733,878 | 2/1956 | Ciscel | 244—78 |
| 2,877,968 | 3/1959 | Granan et al. | 121—41 |
| 2,898,889 | 8/1959 | Foster | 121—41 |
| 2,916,205 | 12/1959 | Litz | 92—152 |
| 2,941,515 | 6/1960 | Garnjost | 121—41 |
| 2,969,773 | 1/1961 | Henry | 121—41 |
| 3,017,865 | 1/1962 | Franz et al. | 121—41 |
| 3,054,039 | 9/1962 | Meredith | 244—77 |
| 3,070,071 | 12/1962 | Cooper | 121—41 |
| 3,095,784 | 7/1963 | Colhoun | 91—363 |
| 3,098,627 | 7/1963 | Lasbrey | 244—77 |

FOREIGN PATENTS

| | | |
|---|---|---|
| 194,995 | 2/1908 | Germany. |
| 320,094 | 4/1920 | Germany. |
| 135,099 | 4/1952 | Sweden. |

SAMUEL LEVINE, *Primary Examiner.*

KARL J. ALBRECHT, RICHARD B. WILKINSON, FRED E. ENGELTHALER, *Examiners.*